United States Patent
Yeo et al.

(10) Patent No.: US 11,621,828 B1
(45) Date of Patent: Apr. 4, 2023

(54) PRIVATELY QUERYING A DATABASE WITH PRIVATE SET MEMBERSHIP USING SUCCINCT FILTERS

(71) Applicant: Google LLC, Mountain View, CA (US)

(72) Inventors: Kevin Yeo, Mountain View, CA (US); Joon Young Seo, Mountain View, CA (US); Sarvar Patel, Montville, NJ (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/448,565

(22) Filed: Sep. 23, 2021

(51) Int. Cl.
*H04L 29/06* (2006.01)
*H04L 9/06* (2006.01)
*G06F 21/62* (2013.01)

(52) U.S. Cl.
CPC ........ *H04L 9/0662* (2013.01); *G06F 21/6227* (2013.01)

(58) Field of Classification Search
USPC .......................................................... 380/46
See application file for complete search history.

(56) References Cited

U.S. PATENT DOCUMENTS

| | | | | |
|---|---|---|---|---|
| 10,182,463 B1* | 1/2019 | Amithrigala | .......... | H04W 12/06 |
| 10,282,373 B2* | 5/2019 | Tadlock | .................. | G06F 16/58 |
| 2010/0070514 A1* | 3/2010 | Woodruff | ............ | G06F 16/9535 |
| | | | | 707/754 |
| 2015/0106411 A1* | 4/2015 | Avati | .................... | G06F 16/182 |
| | | | | 707/827 |
| 2015/0358234 A1* | 12/2015 | Krieger | ................... | H04L 47/19 |
| | | | | 709/235 |
| 2019/0121813 A1* | 4/2019 | Galebach | ............... | G06Q 10/04 |
| 2019/0273617 A1* | 9/2019 | Maher | ..................... | H04L 9/085 |
| 2020/0153765 A1* | 5/2020 | Burbank | .............. | H04L 51/046 |
| 2021/0123761 A1* | 4/2021 | Rolf | ........................ | G06F 16/29 |

* cited by examiner

*Primary Examiner* — Sanchit K Sarker
(74) *Attorney, Agent, or Firm* — Honigman LLP; Brett A. Krueger

(57) ABSTRACT

A method includes obtaining, from a server, a filter including a set of encrypted identifiers each encrypted with a server key controlled by the server. The method includes obtaining a request that requests determination of whether a query identifier is a member of a set of identifiers corresponding to the set of encrypted identifiers. The method also includes transmitting an encryption request to the server that requests the server to encrypt the query identifier. The method includes receiving, from the server, an encrypted query identifier including the query identifier encrypted by the server key and determining, using the filter, whether the encrypted query identifier is not a member of the set of encrypted identifiers. When the encrypted query identifier is not a member of the set of encrypted identifiers, the method includes reporting that the query identifier is not a member of the set of identifiers.

16 Claims, 8 Drawing Sheets

PRIVATELY QUERYING A DATABASE WITH PRIVATE SET MEMBERSHIP USING SUCCINCT FILTERS

TECHNICAL FIELD

This disclosure relates to determining private set membership using succinct filters.

BACKGROUND

Private set membership is a cryptographic problem where a server or other device maintains a set of identifiers and a client desires to query whether a query identifier is a member of the server-held set in a privacy-preserving manner. For example, the client may desire to keep the query identifier secret from the server and/or the server may desire to keep the set of identifiers secret from the client.

SUMMARY

One aspect of the disclosure provides a computer-implemented method that, when executed by data processing hardware, causes the data processing hardware to perform operations. The operations include obtaining, from a server, a filter including a set of encrypted identifiers. Each encrypted identifier of the set of encrypted identifiers is encrypted with a server key controlled by the server. The operations also include obtaining a request from a user. The request requests the data processing hardware to determine whether a query identifier is a member of a set of identifiers. The set of identifiers correspond to the set of encrypted identifiers. The operations also include transmitting an encryption request to the server. The encryption request requests the server to encrypt the query identifier. The operations include receiving, from the server, an encrypted query identifier including the query identifier encrypted by the server key. The operations also include determining, using the filter, whether the encrypted query identifier is not a member of the set of encrypted identifiers and when the encrypted query identifier is not a member of the set of encrypted identifiers, reporting, to the user, that the query identifier is not a member of the set of identifiers.

Implementations of the disclosure may include one or more of the following optional features. In some implementations, the operations further include, when the encrypted query identifier is a member of the set of encrypted identifiers, reporting, to the user, that the query identifier may be a member of the set of identifiers.

Optionally, the operations further include, when using the filter determines that the encrypted query identifier may be a member of the set of encrypted identifiers, determining, using a cryptographic protocol based on ring learning with errors, whether the encrypted query identifier is a member of the set of encrypted identifiers. When using the cryptographic protocol determines that the encrypted query identifier is a member of the set of encrypted identifiers, the operations include reporting, to the user, that the query identifier is a member of the set of identifiers and when using the cryptographic protocol determines that the encrypted query identifier is not a member of the set of encrypted identifiers, the operations include reporting, to the user, that the query identifier is not a member of the set of identifiers.

In some implementations, the filter includes a cuckoo filter or a bloom filter. In some examples, the filter includes a plurality of portions and each portion of the plurality of portions includes a respective subset of encrypted identifiers. In these examples, the operations further includes receiving, from the server, an update to one of the plurality of portions and replacing the one of the plurality of portions with the updated portion.

The operations may further include, prior to receiving the update to the one of the plurality of portions, requesting the update from the server. In some implementations, the encryption request includes an oblivious pseudorandom function and the oblivious pseudorandom function conceals an identity of the query identifier from the server. In some examples, a storage size of the filter is less than a storage size of the set of encrypted identifiers. The set of identifiers may include a set of Uniform Resource Locators (URLs) and the set of encrypted identifiers includes the set of URLs encrypted with the server key.

Another aspect of the disclosure provides data processing hardware and memory hardware in communication with the data processing hardware. The memory hardware stores instructions that when executed on the data processing hardware cause the data processing hardware to perform operations. The operations include obtaining, from a server, a filter including a set of encrypted identifiers. Each encrypted identifier of the set of encrypted identifiers is encrypted with a server key controlled by the server. The operations also include obtaining a request from a user. The request requests the data processing hardware to determine whether a query identifier is a member of a set of identifiers. The set of identifiers correspond to the set of encrypted identifiers. The operations also include transmitting an encryption request to the server. The encryption request requests the server to encrypt the query identifier. The operations include receiving, from the server, an encrypted query identifier including the query identifier encrypted by the server key. The operations also include determining, using the filter, whether the encrypted query identifier is not a member of the set of encrypted identifiers and when the encrypted query identifier is not a member of the set of encrypted identifiers, reporting, to the user, that the query identifier is not a member of the set of identifiers.

This aspect may include one or more of the following optional features. In some implementations, the operations further include, when the encrypted query identifier is a member of the set of encrypted identifiers, reporting, to the user, that the query identifier may be a member of the set of identifiers.

Optionally, the operations further include, when using the filter determines that the encrypted query identifier may be a member of the set of encrypted identifiers, determining, using a cryptographic protocol based on ring learning with errors, whether the encrypted query identifier is a member of the set of encrypted identifiers. When using the cryptographic protocol determines that the encrypted query identifier is a member of the set of encrypted identifiers, the operations include reporting, to the user, that the query identifier is a member of the set of identifiers and when using the cryptographic protocol determines that the encrypted query identifier is not a member of the set of encrypted identifiers, the operations include reporting, to the user, that the query identifier is not a member of the set of identifiers.

In some implementations, the filter includes a cuckoo filter or a bloom filter. In some examples, the filter includes a plurality of portions and each portion of the plurality of portions includes a respective subset of encrypted identifiers. In these examples, the operations further includes receiving, from the server, an update to one of the plurality of portions and replacing the one of the plurality of portions with the updated portion.

The operations may further include, prior to receiving the update to the one of the plurality of portions, requesting the update from the server. In some implementations, the encryption request includes an oblivious pseudorandom function and the oblivious pseudorandom function conceals an identity of the query identifier from the server. In some examples, a storage size of the filter is less than a storage size of the set of encrypted identifiers. The set of identifiers may include a set of Uniform Resource Locators (URLs) and the set of encrypted identifiers includes the set of URLs encrypted with the server key.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
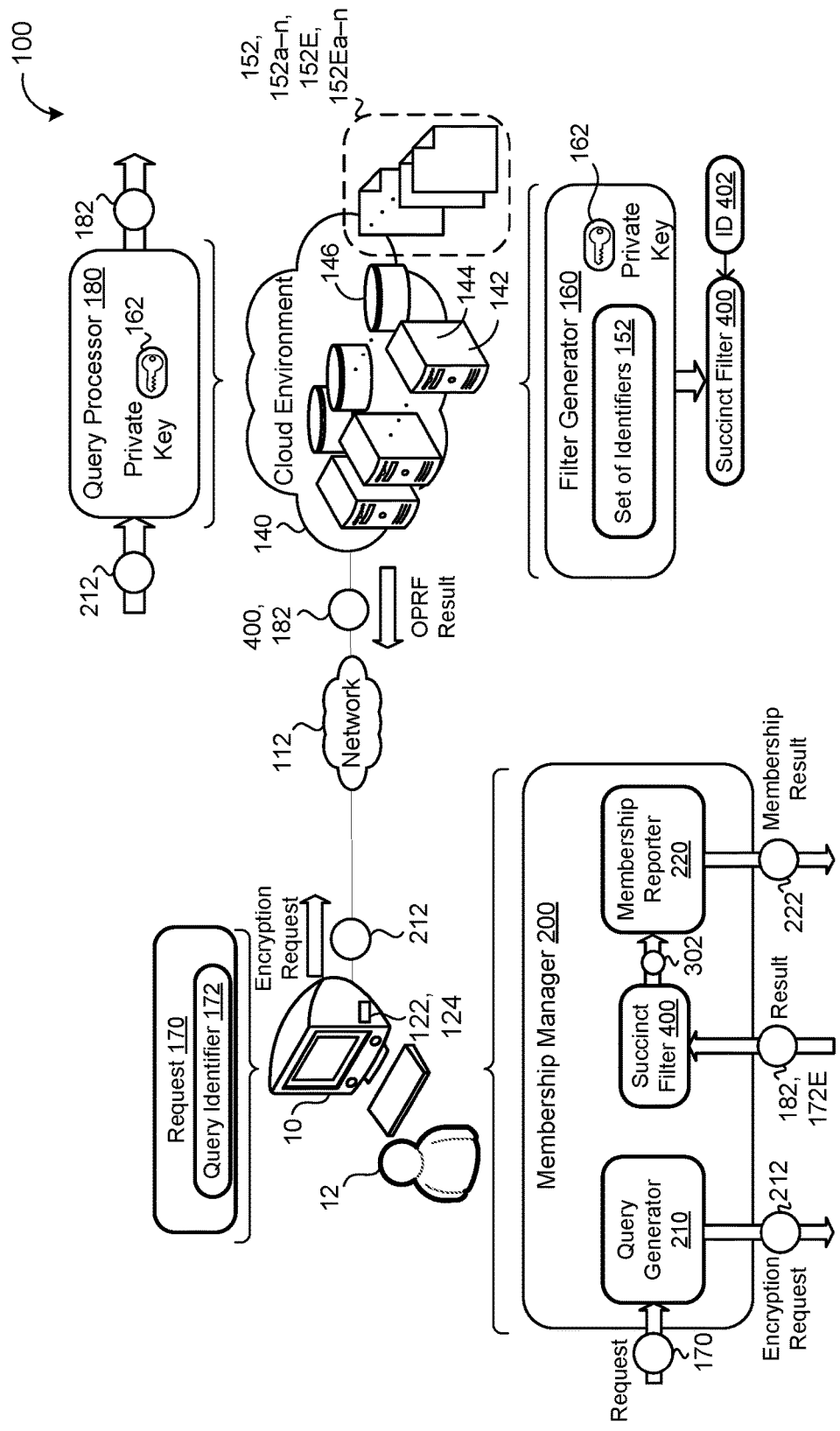
FIG. 1 is a schematic view of an example system that provides private set membership capabilities using a succinct filter.

Private set membership refers to a cryptographic problem where a server maintains a set of identifiers and a client queries the server to determine whether a specific identifier is present in the set of identifiers in a privacy-preserving manner. For example, the client may keep the queried identifier secret from the server and/or the server may keep the set of identifiers secret from the client. Such features are desirable in, for example, a URL verification system, where a client wants to determine if a URL is included in a list of known malicious URLs without revealing to the server the specific URL the client is requesting. As another example, a password leak check system may involves a client verifying if their password has been compromised (i.e., via a list of known compromised passwords) without the client revealing the password to the server or without the server revealing the entire list of compromised passwords to the client.

One possibility for a private set membership system involves the server encrypting the entire set of identifiers with a private key and transmitting the entire encrypted set to the client. The client may then request the server encrypt (using the same private key) a query identifier (i.e., an identifier the client wishes to check against the server's set), and when the server returns the encrypted identifier, the client can determine if the encrypted identifier appears in the list of stored encrypted identifiers. While this method is relatively fast and efficient once established, it unfortunately requires the client to have sufficient bandwidth and storage to receive and store the entirety of the set of encrypted identifiers. In many scenarios, the client device will not have sufficient bandwidth and/or storage capabilities to make such a system feasible.

Succinct filters are space-efficient probabilistic data structures that may be used to determine whether an element is a member of a set. Generally, false positive matches are possible while false negatives are not. That is, a succinct filter returns that either the element is not a member of the set or that the element may be a member of the set (i.e., definitely not in the set or possibly in the set). Common examples of succinct filters are bloom filters and cuckoo filters.

Implementations herein are directed toward a private set membership system that uses a succinct filter to maintain privacy between a client device and a server while drastically reducing the bandwidth and storage requirements of the client device. The server (or other computing device) generates a succinct filter that includes a set of encrypted identifiers and provides the succinct filter to the client device. Using the succinct filter, the system performs approximate membership queries that may incur false positives but not false negatives. The client sends a request to the server requesting the server to encrypt a query identifier using the same key used to encrypt the set of encrypted identifiers. The client, after receiving the encrypted query identifier from the server, determines, using the succinct filter, whether the encrypted query identifier is not present in the set of encrypted identifiers. When the encrypted query identifier is not present, the client may generate a report or alert for a user indicating that the query identifier is not present in the set of identifiers that corresponds to the set of encrypted identifiers.

Referring now to FIG. 1, in some implementations, an example system 100 includes a client device 10 (e.g., a user device) associated with a respective user or client 12 and in communication with a remote system 140 via a network 112. The client device 10 may correspond to any computing device, such as a desktop workstation, a laptop workstation, a server, or a mobile device (i.e., a smart phone). The client device 10 includes computing resources 122 (e.g., data processing hardware) and/or storage resources 124 (e.g., memory hardware).

The remote system 140 may be a single computer, multiple computers, or a distributed system (e.g., a cloud environment) having scalable/elastic computing resources 142 (e.g., data processing hardware) and/or storage resources 144 (e.g., memory hardware). A data store 150 (i.e., a remote storage device 150) may be overlain on the storage resources 144 to allow scalable use of the storage resources 144 by one or more of the client or computing resources 142. The data store 150 is configured to store a set of identifiers 152, 152a-n. Each identifier 152 uniquely identifies a piece of information (e.g., an email, a URL, a password, an image, etc.). For example, the set of identifiers 152 identifies a set of known malicious URLs or a set of compromised passwords. The remote system executes a filter generator 160.

The filter generator 160 encrypts each identifier 152 in the set to generate a set of encrypted identifiers 152E, 152Ea-n. Each identifier 152 is encrypted using the same private key 162. The private key 162 is kept secret from the client device 10 and client 12. The filter generator 160 populates a filter 400 (i.e., a succinct filter) with the encrypted identifiers 152E using any conventional means appropriate for the specific succinct filter 400. In some examples, the succinct filter 400 is a cuckoo filter using hash tables based on cuckoo hashing to store fingerprints of each encrypted identifier 152E. In other examples, the succinct filter 400 is a bloom filter using a bit array and hash functions to map hashes of the encrypted identifiers 152E to the array positions. Because cuckoo filters enable element insertion and element deletion, a cuckoo filter may be desirable over a bloom filter (which only enables element insertions) in use cases where deletions of identifiers 152 is useful or necessary.

The remote system 140 provides the client device 10 the succinct filter 400 via, for example, the network 112. The client device 10 stores the succinct filter in the memory hardware 124. Because the succinct filter 400 is smaller in size than the set of encrypted identifiers 152E, the succinct filter 400 requires less bandwidth to receive from the remote system 140 and requires less storage space to store at the memory hardware 124 than receiving and storing the entirety of the set of encrypted identifiers 152E.

The client device 10 executes a membership manager 200. In some examples, the membership manager 200 obtains a request from the client 12 requesting that the client device 10 (i.e., the data processing hardware 122) to determine whether a query identifier 172 is a member of the set of identifiers 152 stored at the remote system 140. For example, when the set of identifiers 152 represents a list of known malicious URLs, the query identifier 172 identifies a URL that the user 12 desires to check against the set of identifiers 152 to determine whether or not the URL may be malicious. The client 12 provides the request 170 to the membership manager 200 via, for example, interacting with an application executing on the client device 10 (e.g., a web browser). In other examples, the membership manager 200 receives the request 170 from other sources, such as another computing device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The membership manager 200, in some implementations, includes a query generator 210. The query generator 210 receives the request 170 from the client 12 and transmits an encryption request 212 to the remote system 140. The encryption request 212 requests that the remote system 140 encrypts the query identifier 172 using the same private key 162 used to encrypt the set of encrypted identifiers 152E. Because the client device 10 (and thus the membership manager 200) does not have access to the private key 162, the client device 10 must rely on the remote system 140 to encrypt the query identifier 172.

The remote system 140 receives the encryption request 212 at a query processor 180. The query processor 180 encrypts the identifier 152 indicated by the encryption request 212 (i.e., the query identifier 172) using the same private key 162 used to encrypt the set of encrypted identifier 152E that populated the succinct filter 400. When, for example, the client 12 does not wish to keep the query identifier 172 secret from the remote system 140, the encryption request 212 may directly include or reference the query identifier 172 and the remote system 140 merely encrypts the indicated query identifier 172 and returns a result 182 to the client device 10. When, however, the client 12 desires to keep the query identifier 172 secret from the remote system 140 (i.e., the client 12 desires for the remote system 140 to encrypt the query identifier 172 without learning the identity of the query identifier 172), the query generator 210 may include an oblivious pseudorandom function (OPRF). An OPRF conceals information from each of two parties involved with the OPRF. For example, the client device 10 cryptographically hashes the query identifier 172 and cryptographically blinds the hash to produce a message for the remote system 140. The remote system 140 may in turn "mix" the message with the private key 162 and return the result 182 to the client device 10, which may unblind the result 182 to obtain an encrypted query identifier 172E that corresponds to the query identifier 172 encrypted by the private key 162.

The client device 10 and the remote system 140 may implement any appropriate algorithms to support the OPRF. For example, the client device may generate a random key R, and compute an encrypted input $e=H(x)^R$ which the client device 10 transmits to the remote system 140. The remote system 140 may compute a doubly encrypted input $de=e^K=H(x)^{RK}$. The remote system may then send de to the client device 10, and the client device 10 may compute $de^{1/R}=H(x)^{RK(1/R)}=H(k)^K$ which results in OPRF(K, x). Using this exchange, the remote system 140 will not learn which specific identifier 152 the query identifier 172 corresponds to, nor does the client device 10 learn the remote system's private key 162 or information regarding other identifiers 152 in the set.

The client device 10 receives the result 182 from the remote system 140, which includes the encrypted query identifier 172E corresponding to the query identifier 172 encrypted by the private key 162. The succinct filter 400 determines whether the encrypted query identifier 172E is not a member of the set of encrypted identifiers 152E (i.e., the set of encrypted identifiers 152E that populates the succinct filter 400). The succinct filter 400 generates an output 302 for a membership reporter 220 indicating either that the encrypted query identifier 172E is not in the set of encrypted identifiers 152E or that the encrypted query identifier 172 may be in the set of encrypted identifier 152E.

Because the succinct filter 400 may incur false positives but does not incur false negatives, the succinct filter 400 can conclusively determine that the encrypted query identifier 172E is not in the set of encrypted identifiers 152E, but the succinct filter 400 cannot conclusively determine that the encrypted query identifier 172E is in the set of encrypted identifiers 152E. Because many common use cases will predominantly result in the encrypted query identifier 172E not being present in the set of encrypted identifiers 152E, such as when checking for a malicious URL, the succinct filter 400 will typically return that the encrypted query identifier 172E is not present in the set of encrypted identifiers 152E.

Figure 2A:
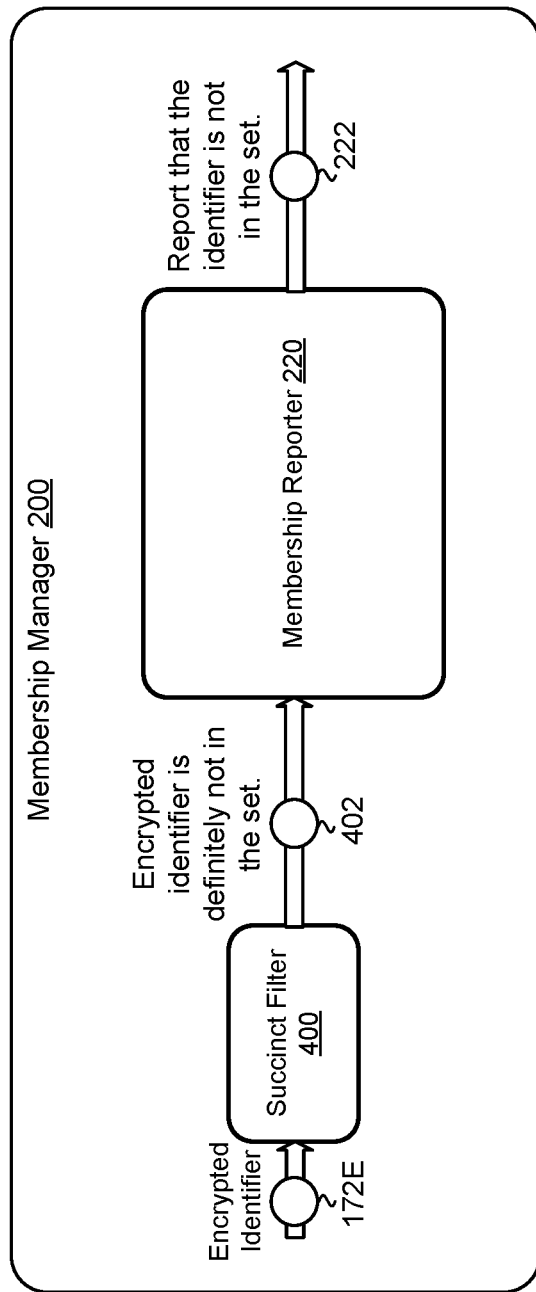
FIGS. 2A and 2B are schematic views of exemplary outputs of the succinct filter of FIG. 1.

Referring now to FIG. 2A, in the scenario when the encrypted query identifier 172E is not in the set of encrypted identifiers 152E, the membership reporter 220 generates a report 222 that indicates to the client 12 (e.g., via a display of the client device 10) or other entity that generated the request 170, that the query identifier 172 is not in the set of identifiers 152. In the example when the set of identifiers 152 identifies a set of known malicious URLs, the report 222 indicates that the URL represented by the query identifier 172 is not in the list of known malicious URLs. Because the client device 10 does not have access to the private key 162 of the remote system 140 and because the succinct filter 400 is populated only with the encrypted identifiers 152E, the client device 10 does not learn any information from the remote system 140 regarding the set of identifiers 152 other than that the query identifier 172 does not appear in the set of identifiers 152.

Figure 2B:
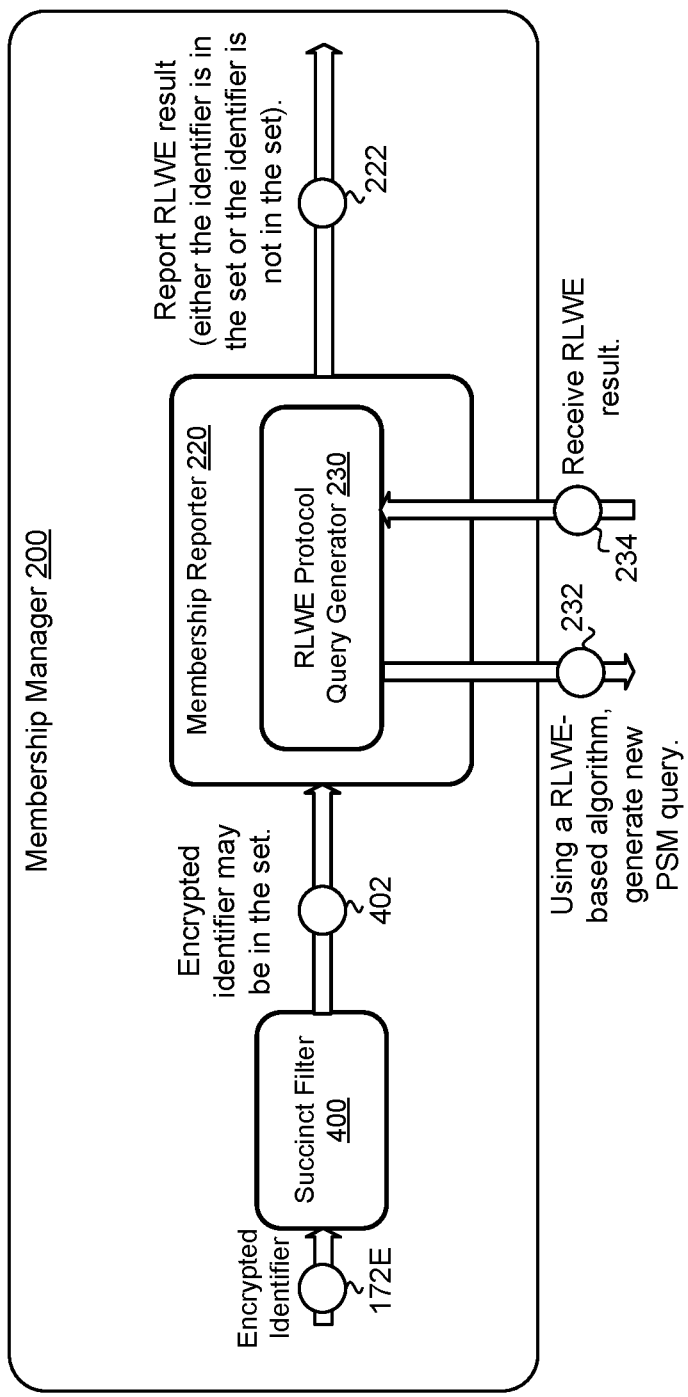

Referring now to FIG. 2B, in the scenario when the encrypted query identifier 172E may be in the set of encrypted identifiers 152E (i.e., the succinct filter 400 was not able to conclusively determine that the encrypted query identifier 172E is not in the set of encrypted identifiers 152E), the membership reporter 220 may provide the report 222 to the client 12 indicating that the query identifier 172 may be in the set of identifiers 152. In some scenarios, such a report 222 may be sufficient for the client 12. That is, in some instances, the client 12 may not require conclusive evidence that the query identifier 172 is present in the set of identifiers 152, and the knowledge that the query identifier 172 may be in the set of identifiers 152 is sufficient. The likelihood of a false positive (i.e., the succinct filter 400 indicates that the encrypted query identifier 172E may be present in the set of encrypted identifiers 152E, but the encrypted query identifier 172E is not actually present in the set of encrypted identifiers 152E) is based on the size of the succinct filter 400. When the succinct filter 400 is larger, the chances for false positives decreases, but the storage and bandwidth requirements correspondingly increase. Likewise, when the succinct filter 400 is smaller, the chances for false positives increases, but the storage and bandwidth requirements correspondingly decrease. The size of the succinct filter 400 may be configurable (e.g., by the remote system 140 or the client device 10) based on the use case (e.g., the type if identifiers 152, storage capabilities of the client device 10, etc.). In some examples, the membership manager 200, in the report 222, indicates the likelihood of a false positive.

In some implementations, the membership reporter 220 includes a ring learning with errors (RLWE) protocol query generator 230. Optionally (e.g., in response to a client request when the client 12 determines that the chance of a false positive is too great, automatically without any user intervention), the RLWE protocol query generator 230 determines whether the encrypted query identifier 172E is a member of the set of encrypted identifiers 152E held by the remote system 140. For example, the RLWE protocol query generator 230 generates an RLWE query 232 and transmits the RLWE query 232 to the remote system 140. The remote system 140 receives a RLWE result 234 that conclusively determines whether the encrypted query identifier 172E is or is not in the set of encrypted identifiers 152E. In either case, the membership reporter 220 generates the report 222 indicating the presence or lack of presence of the query identifier 172 in the set of identifiers 152.

Figure 3:
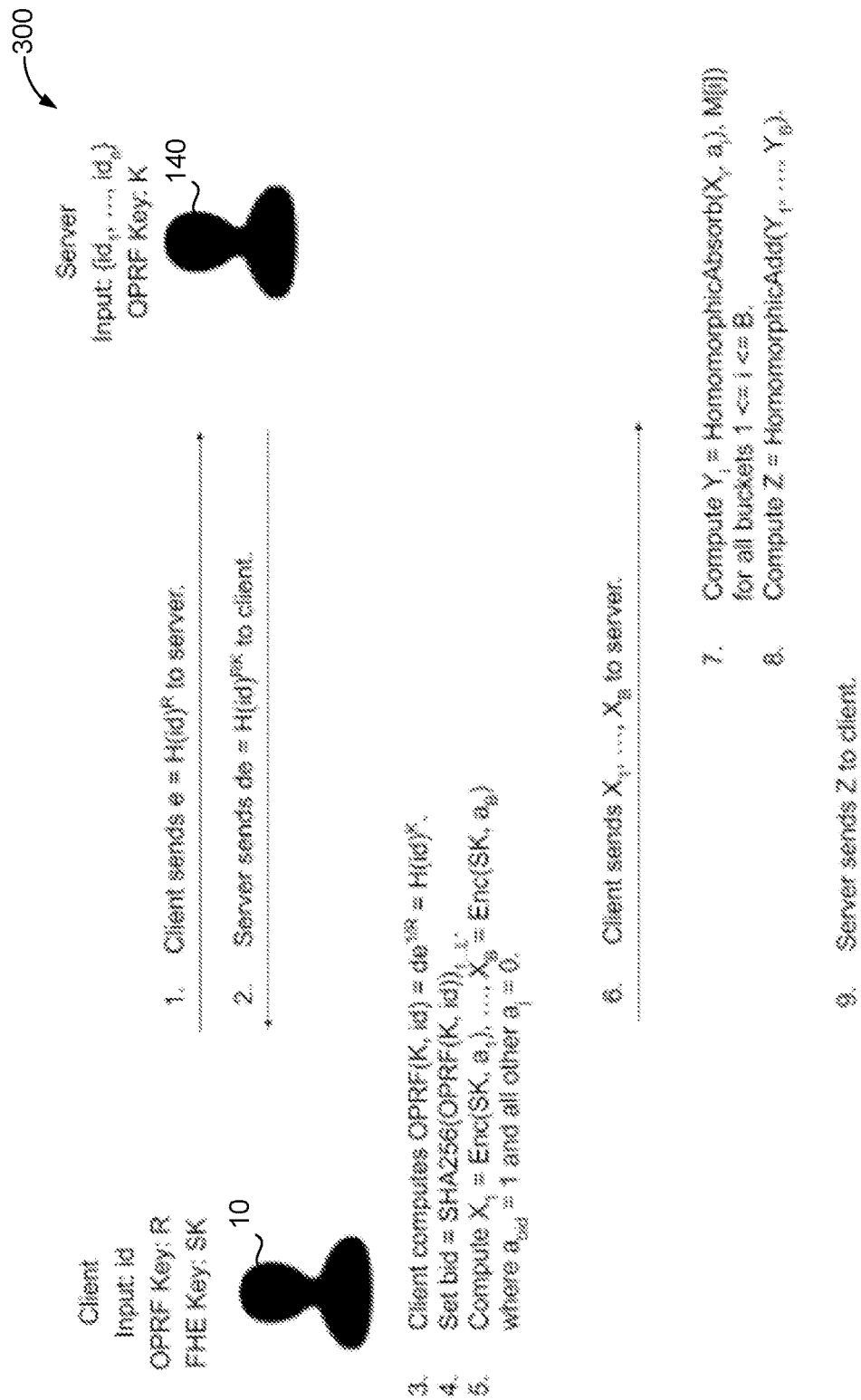
FIG. 3 is a schematic view of a ring learning with errors algorithm.

While the RLWE query 232 and RLWE result 234 may conclusively determine whether or not the encrypted query identifier 172E is a member of the set of encrypted identifier 152E, generally speaking, the RLWE query 232 requires significantly more resources (e.g., computing resources, bandwidth resources, latency, etc.) than testing via the succinct filter 400. When the use case of the system involves the encrypted query identifier 172E typically not being present in the set of encrypted identifiers 152E, the succinct filter 400 will save significant resources as the RLWE protocol will rarely need to be relied upon. In some examples, the RLWE protocol uses a fully homomorphic encryption scheme. While any appropriate RLWE protocol is within the scope of implementations described herein, FIG. 3 illustrates an exemplary RLWE protocol that the system may employ.

Referring back to FIG. 1, when there are updates to the set of identifiers 152, such as, for example, when additional known malicious URLs must be added to the list, the client device 10 requires an updated succinct filter 300 before the updated (i.e., added or deleted) identifiers 152 are accounted for. When there is a change to the set of identifiers 152 (i.e., one or more identifiers 152 have been added and/or one or more identifiers 152 have been deleted), the filter generator 160 may generate a new or updated set of encrypted identifiers 152E and a corresponding new or updated succinct filter 400 that reflects the updated set of identifiers 152. The remote system 140 may transmit the new or updated succinct filter 400 to the client device 10. The remote system 140 may generate a new succinct filter 400 any time there is a change to the set of identifiers 152 (i.e., real-time updates) or, alternatively, the remote system 140 batches multiple updates together and generates a new succinct filter 400 after a sufficient amount of time has passed since the last succinct filter 400 was generated and/or a sufficient number of changes have been made to the set of identifiers 152 since the last succinct filter 400 was generated.

The remote system 140 may provide new succinct filters 400 to the client device 10 based on a "push" model, a "pull" model, or a hybrid model that combines elements of both the push and pull models. In the push model, the remote system 140 "pushes" or provides the new succinct filter 400 to the client device 10 automatically, such as at regular intervals or whenever a new succinct filter 400 is available. In the pull model, the client device 10 requests the remote system 140 provide the new succinct filter 400, in which case the remote system 140 responds with an updated succinct filter 400. In this model, the client device 10 may periodically poll the remote system 140 to determine whether a new or updated succinct filter 400 is available. The hybrid model, in some examples, includes the remote system 140 providing the client device 10 with a notification whenever a new succinct filter 400 is available. In this example, the client device 10 determines when to retrieve the latest succinct filter 400 from the remote system 140.

In some examples, each generated succinct filter 400 is uniquely associated with a version identifier 402. That is, each version identifier 402 identifies one and only one specific succinct filter 400. The client device 10 and/or the remote system 140 may track the last version (via the version identifier 402) that the client device 10 has received. Using the version identifier 402, the filter generator 160 may provide the client device 10 with incremental updates for the succinct filter 400. For example, when the client device 10 currently has a first version of a succinct filter (based on a first version identifier 402) and the remote system 140 has a second version of the succinct filter 400 (based on a second version identifier 402), the remote system 140 provides the client device 10 with only the differences between the first version of the succinct filter 400 and the second version of the succinct filter 400, which may drastically reduce the bandwidth necessary to update the client device 10. The remote system 140 may track which version the client device 10 has received. Alternatively, the client device 10 notifies the remote system 140 of the most recent version that the client device 10 has received. To support incremental updates, the filter generator 160 may store a previous number of the succinct filters 400 so that the remote system 140 may track and provide the differences between different versions.

Figure 4:
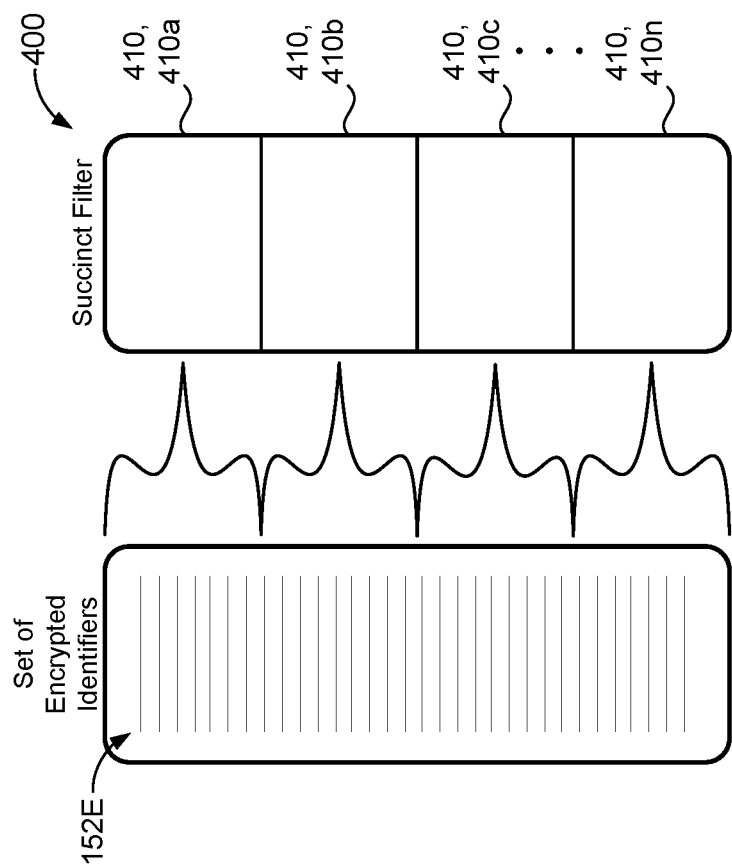
FIG. 4 is a schematic view of a succinct filter divided into a number of portions.

Referring now to FIG. 4, in some examples, the succinct filter 400 includes a plurality of portions 410, 410a—n. Each portion 410 of the succinct filter 400 includes a respective subset of the encrypted identifiers 152E. In some examples, each portion 410 may be a separate succinct filter 400. When the remote system 140 receives an update to the set of identifiers 152, the remote system 140 may only update a single corresponding portion 410 of the succinct filter 400. That is, instead of generating an entire new succinct filter 400, the remote system 140 may update only a respective portion 410 of the succinct filter 400. The client device 10 and/or remote system 140 may configure a size and/or a number of portions 410.

Figure 5:
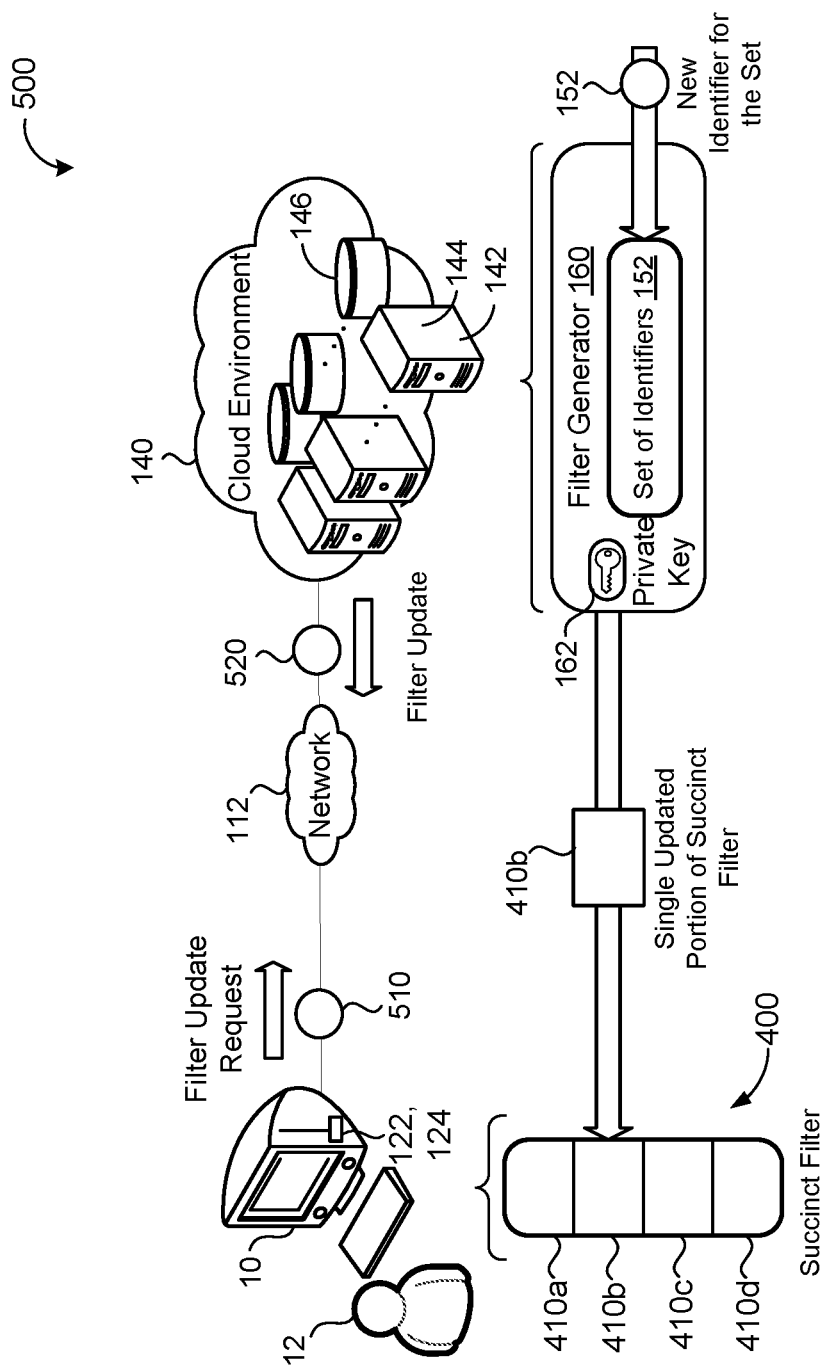
FIG. 5 is a schematic view of updating one of the portions of the succinct filter of FIG. 3.

Referring now to the schematic view 500 of FIG. 5, in some implementations, the filter generator 160 receives an update to the set of identifiers 152, such as an addition of a new identifier 152 or deletion of an existing identifier 152. The filter generator 160 updates the set of encrypted identifiers 152E and generates a new succinct filter 400 that includes the updates to the set of encrypted identifiers 152E. In some examples, the filter generator 160 updates a portion 410 of the succinct filter 400. The client device 10, in some examples, receives, from the remote system 140, the updated portion 410 from the remote system 140. Here, the succinct filter 400 includes four portions 410a—d. The updated portion updates the portion 410b. The client device 10 may replace the one of the portions 410 with the updated portion 410 (i.e., updated portion 410b in this example). In this way, the client device 10 only updates a portion of the succinct filter 400 and bandwidth requirements are reduced. The client device 10 may generate a request 510 for the updated portion 410. Alternatively, the filter generator 160 may provide a filter update 520 including the updated portion 410 to the client device 10 without prompting from the client device 10.

Thus, the system provides a device the capability of providing a private membership query to a server without revealing the identity of the queried element to the server. Moreover, the server can provide a response without revealing any identifiers except for whether the queried identifier is a member of the set. Combined with a query rate-limiter (i.e., a technique limiting the frequency the server will respond to queries), the server can avoid users and/or devices from brute forcing the identifier space to determine database contents. Using one or more succinct filters, the system may provide significant bandwidth and storage savings versus implementations that require the client device store the entirety of set of encrypted identifiers.

While examples herein include using a set of encrypted identifiers 152E to conceal information regarding the set of identifiers 152 from the client device 10, in some examples, this concealment may not be necessary or desirable. In these examples, the system 100 may operate as described above, except the succinct filter 400 is populated with the set of identifiers 152 directly instead of the set of encrypted identifiers 152E. Then, the client device 10 may query the succinct filter 400 directly using the query identifier 172 without the need to acquire the encrypted query identifier 172E from the remote system 140. When the succinct filter 400 is unable to definitively confirm that the query identifier 172 is not present in the set of identifiers 152, the client device 10 may then query the remote system 140 to determine whether the query identifier 172 is present in the set of identifiers 152.

Figure 6:
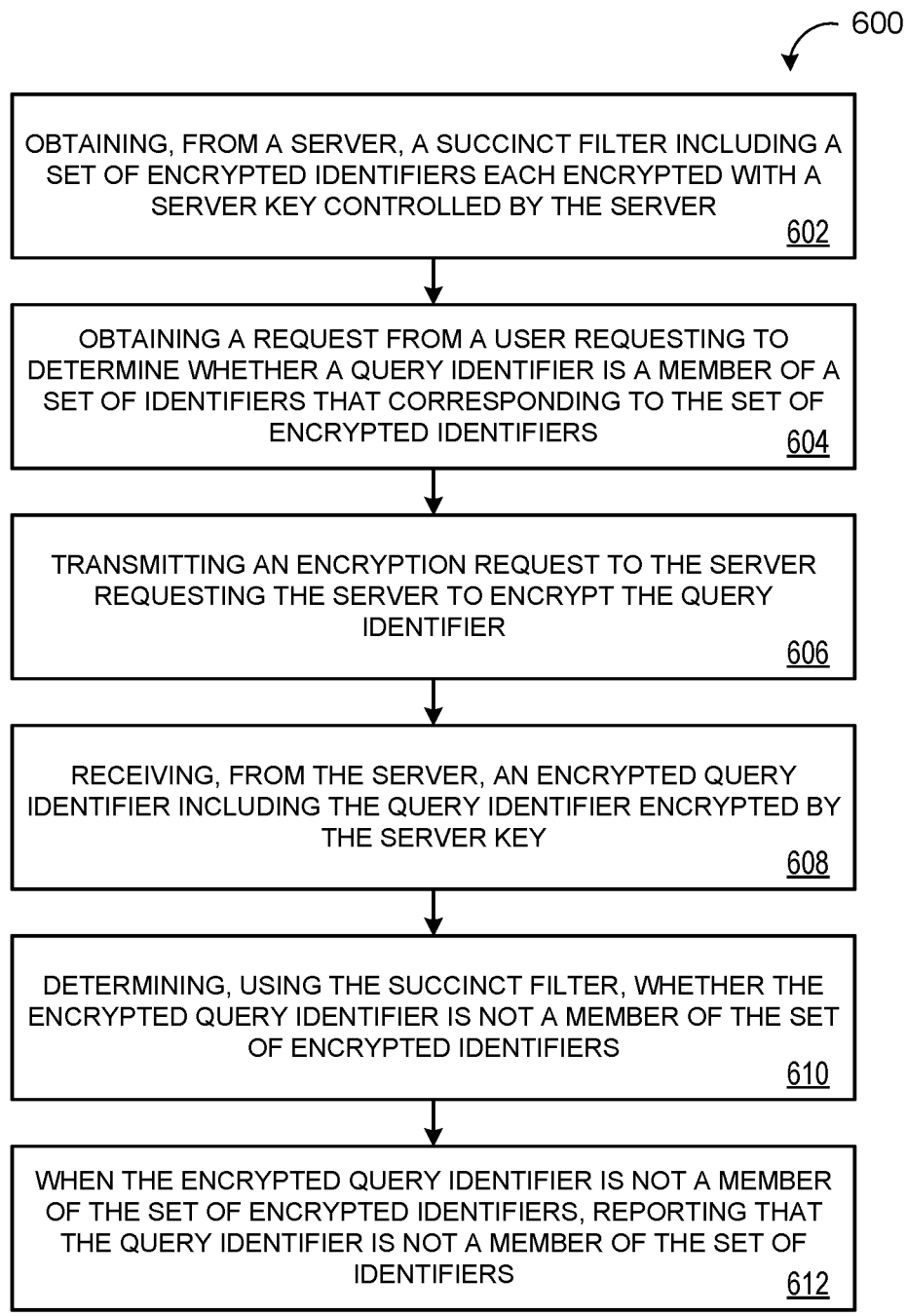
FIG. 6 is a flowchart of an example arrangement of operations for a method of providing private set membership using a succinct filter.

FIG. 6 is a flowchart of an exemplary arrangement of operations for a method 600 of determining private set membership using a filter. The method 600 includes, at operation 602, obtaining, from a server 140 (i.e., a remote computing system 140), a filter 400 that includes a set of encrypted identifiers 152E. Each encrypted identifier 152E of the set of encrypted identifiers 152E is encrypted with a server key 162 (i.e., a private key) controlled by the server 140. At operation 604, the method 600 includes obtaining a request 170 from a user 12. The request 170 requests data processing hardware 122 (e.g., of a client device 10) to determine whether a query identifier 172 is a member of a set of identifiers 152. The set of identifiers 152 correspond to the set of encrypted identifiers 152E.

The method 600, at operation 606, includes transmitting an encryption request 212 to the server 140. The encryption request requests the server 140 to encrypt the query identifier 172. At operation 608, the method 600 includes receiving, from the server 140, an encrypted query identifier 172E that includes the query identifier 172 encrypted by the server key 162.

The method 600, at operation 610, includes determining, using the filter 400, whether the encrypted query identifier 172E is not a member of the set of encrypted identifiers 152E. At step 612, the method 600 includes, when the encrypted query identifier 172E is not a member of the set of encrypted identifiers 152E, reporting, to the user 12, that the query identifier 172 is not a member of the set of identifiers 152.

Figure 7:
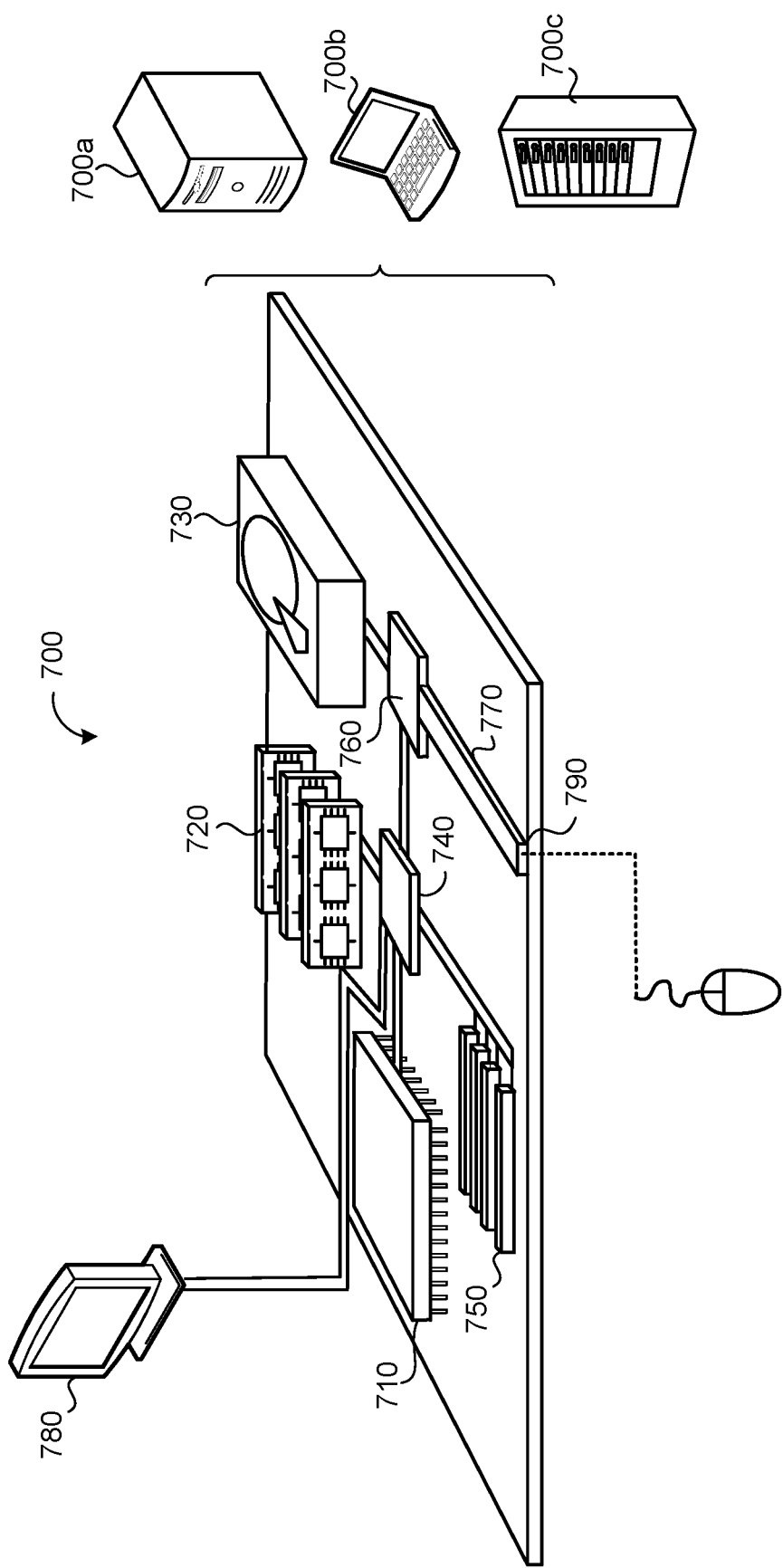
FIG. 7 is a schematic view of an example computing device that may be used to implement the systems and methods described herein.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
   obtaining, from a server, a filter comprising a set of encrypted identifiers, each encrypted identifier of the set of encrypted identifiers encrypted with a server key controlled by the server, wherein the filter comprises a plurality of portions, each portion of the plurality of portions comprising a respective subset of encrypted identifiers;

receiving, from the server, an update to one of the plurality of portions;

replacing the one of the plurality of portions with the updated portion;

obtaining a request from a user, the request requesting the data processing hardware to determine whether a query identifier is a member of a set of identifiers, the set of identifiers corresponding to the set of encrypted identifiers;

transmitting an encryption request to the server, the encryption request requesting the server to encrypt the query identifier;

receiving, from the server, an encrypted query identifier comprising the query identifier encrypted by the server key;

determining, using the filter, whether the encrypted query identifier is not a member of the set of encrypted identifiers; and when the encrypted query identifier is not a member of the set of encrypted identifiers, reporting, to the user, that the query identifier is not a member of the set of identifiers.

2. The method of claim 1, wherein the operations further comprise, when the encrypted query identifier is a member of the set of encrypted identifiers, reporting, to the user, that the query identifier may be a member of the set of identifiers.

3. The method of claim 1, wherein the operations further comprise, when using the filter determines that the encrypted query identifier may be a member of the set of encrypted identifiers:

determining, using a cryptographic protocol based on ring learning with errors, whether the encrypted query identifier is a member of the set of encrypted identifiers;

when using the cryptographic protocol determines that the encrypted query identifier is a member of the set of encrypted identifiers, reporting, to the user, that the query identifier is a member of the set of identifiers; and when using the cryptographic protocol determines that the encrypted query identifier is not a member of the set of encrypted identifiers, reporting, to the user, that the query identifier is not a member of the set of identifiers.

4. The method of claim 1, wherein the filter comprises a cuckoo filter or a bloom filter.

5. The method of claim 1, wherein the operations further comprise, prior to receiving the update to the one of the plurality of portions, requesting the update from the server.

6. The method of claim 1, wherein:

the encryption request comprises an oblivious pseudorandom function; and the oblivious pseudorandom function conceals an identity of the query identifier from the server.

7. The method of claim 1, wherein a storage size of the filter is less than a storage size of the set of encrypted identifiers.

8. The method of claim 1, wherein the set of identifiers comprises a set of Uniform Resource Locators (URLs) and the set of encrypted identifiers comprises the set of URLs encrypted with the server key.

9. A system comprising:

data processing hardware; and memory hardware in communication with the data processing hardware, the memory hardware storing instructions that when executed on the data processing hardware cause the data processing hardware to perform operations comprising:

causes the data processing hardware to perform operations comprising:

obtaining, from a server, a filter comprising a set of encrypted identifiers, each encrypted identifier of the set of encrypted identifiers encrypted with a server key controlled by the server, wherein the filter comprises a plurality of portions, each portion of the plurality of portions comprising a respective subset of encrypted identifiers;

receiving, from the server, an update to one of the plurality of portions;

replacing the one of the plurality of portions with the updated portion;

obtaining a request from a user, the request requesting the data processing hardware to determine whether a query identifier is a member of a set of identifiers, the set of identifiers corresponding to the set of encrypted identifiers;

transmitting an encryption request to the server, the encryption request requesting the server to encrypt the query identifier;

receiving, from the server, an encrypted query identifier comprising the query identifier encrypted by the server key;

determining, using the filter, whether the encrypted query identifier is not a member of the set of encrypted identifiers; and when the encrypted query identifier is not a member of the set of encrypted identifiers, reporting, to the user, that the query identifier is not a member of the set of identifiers.

10. The system of claim 9, wherein the operations further comprise, when the encrypted query identifier is a member of the set of encrypted identifiers, reporting, to the user, that the query identifier may be a member of the set of identifiers.

11. The system of claim 9, wherein the operations further comprise, when using the filter determines that the encrypted query identifier may be a member of the set of encrypted identifiers:

determining, using a cryptographic protocol based on ring learning with errors, whether the encrypted query identifier is a member of the set of encrypted identifiers;

when using the cryptographic protocol determines that the encrypted query identifier is a member of the set of encrypted identifiers, reporting, to the user, that the query identifier is a member of the set of identifiers; and when using the cryptographic protocol determines that the encrypted query identifier is not a member of the set of encrypted identifiers, reporting, to the user, that the query identifier is not a member of the set of identifiers.

12. The system of claim 9, wherein the filter comprises a cuckoo filter or a bloom filter.

13. The system of claim 9, wherein the operations further comprise, prior to receiving the update to the one of the plurality of portions, requesting the update from the server.

14. The system of claim 9, wherein:

the encryption request comprises an oblivious pseudorandom function; and the oblivious pseudorandom function conceals an identity of the query identifier from the server.

15. The system of claim 9, wherein a storage size of the filter is less than a storage size of the set of encrypted identifiers.

16. The system of claim 9, wherein the set of identifiers comprises a set of Uniform Resource Locators (URLs) and the set of encrypted identifiers comprises the set of URLs encrypted with the server key.

\* \* \* \* \*